United States Patent [19]

Moritsch et al.

[11] 4,164,153
[45] Aug. 14, 1979

[54] DEVICE FOR USE IN MECHANICAL POWER TRANSMISSION SYSTEM

[76] Inventors: Denis J. Moritsch, 8205 Woodland Ave., Wauwatosa, Wis. 53213; Fred A. Moritsch, 171 Las Flores, Nipomo, Calif. 93444

[21] Appl. No.: 859,053

[22] Filed: Dec. 9, 1977

[51] Int. Cl.² .................... F16H 11/02; F16H 11/06; B62M 9/00; B62M 25/00
[52] U.S. Cl. ................. 74/217 B; 280/236; 280/261; 74/217 CV
[58] Field of Search .......... 74/217 B, 217 CV, 217 R, 74/63, 66, 68; 280/236, 237, 238, 261

[56] References Cited

U.S. PATENT DOCUMENTS

| 3,613,466 | 10/1971 | Houghton | 74/217 B |
|---|---|---|---|
| 3,913,947 | 10/1975 | Harris | 74/217 B |
| 4,061,046 | 12/1977 | Lang | 280/236 |

[56] References Cited

FOREIGN PATENT DOCUMENTS

| 105604 | 9/1898 | Fed. Rep. of Germany | 280/238 |
|---|---|---|---|
| 5553 | 4/1901 | Fed. Rep. of Germany | 280/238 |
| 687829 | 1/1940 | Fed. Rep. of Germany | 280/236 |
| 981625 | 5/1951 | France | 74/217 B |
| 292030 | 6/1932 | Italy | 280/236 |
| 378935 | 2/1940 | Italy | 280/236 |
| 19997 | 7/1899 | Switzerland | |
| 13234 | of 1894 | United Kingdom | 280/238 |
| 7334 | of 1899 | United Kingdom | 280/238 |
| 6767 | of 1902 | United Kingdom | 280/236 |

*Primary Examiner*—Samuel Scott
*Assistant Examiner*—William R. Henderson
*Attorney, Agent, or Firm*—Michael, Best & Friedrich

[57] ABSTRACT

Disclosed herein is a bicycle comprising a frame, a pair of wheels supporting the frame, a sprocket fixed to one of the wheels, a drive member rotatably carried by the frame, a pair of pedals connected to the drive member, a plurality of links carried by the drive member for common rotation therewith and for pivotal movement relative thereto, a driven member, an inner guide ring, an arm supporting the inner guide ring on the frame for transverse movement relative to the rotary axis of the drive member, surfaces on each of the outer ends of the links and on the driven member and on the inner ring for mounting the driven member for common movement with the inner ring and for rotation relative thereto and for effecting rotation of the driven member in response to rotation of the drive member, a cylinder-piston arrangement on the frame for displacing the inner ring relative to the rotary axis of the drive member to vary the rate of rotation of the driven member relative to the drive member, and an endless member trained around the sprocket and the driven member.

19 Claims, 13 Drawing Figures

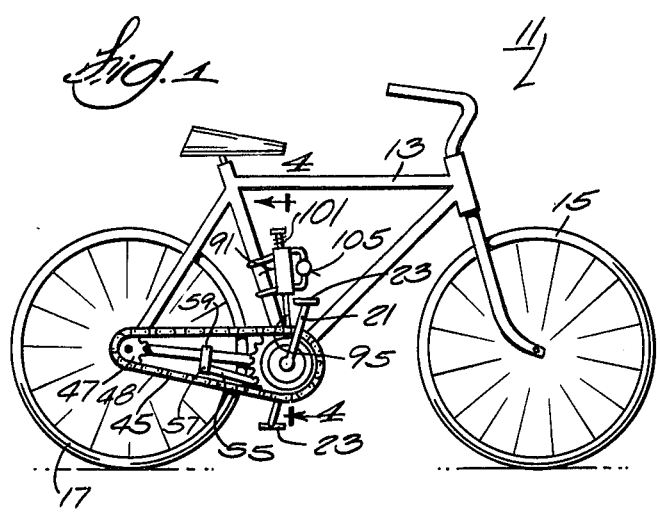
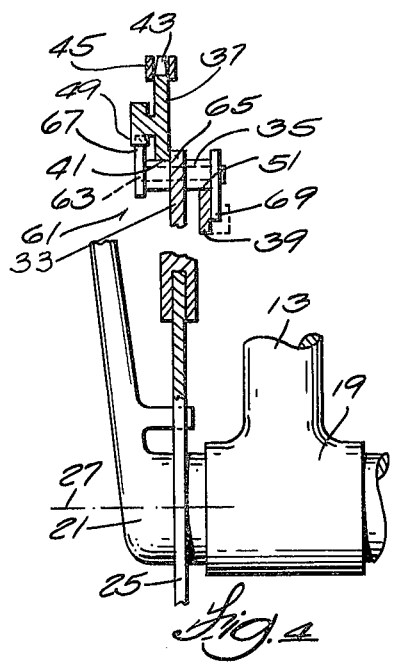
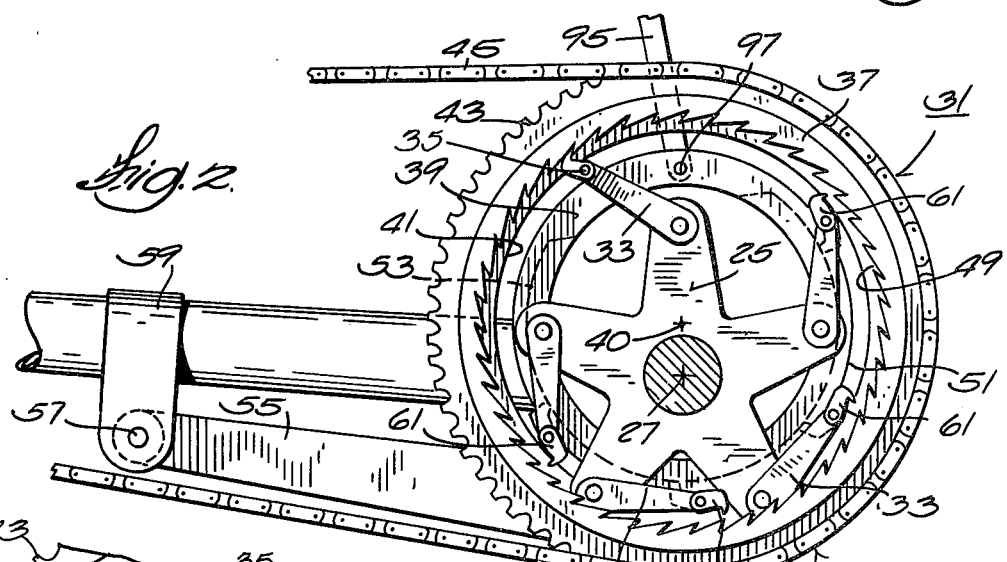
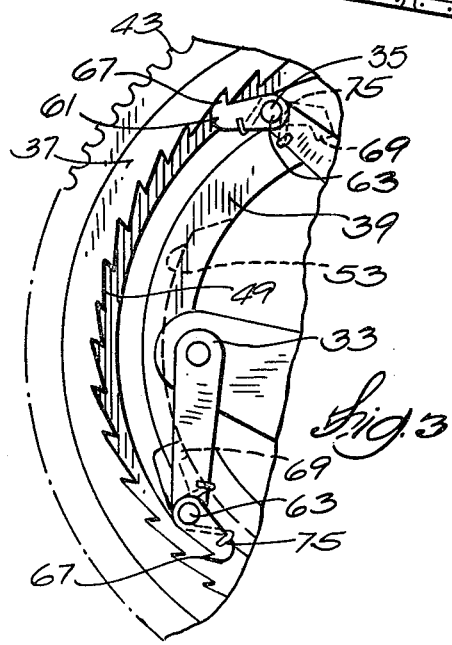
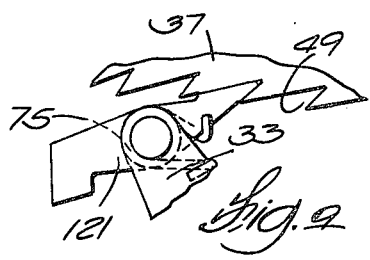

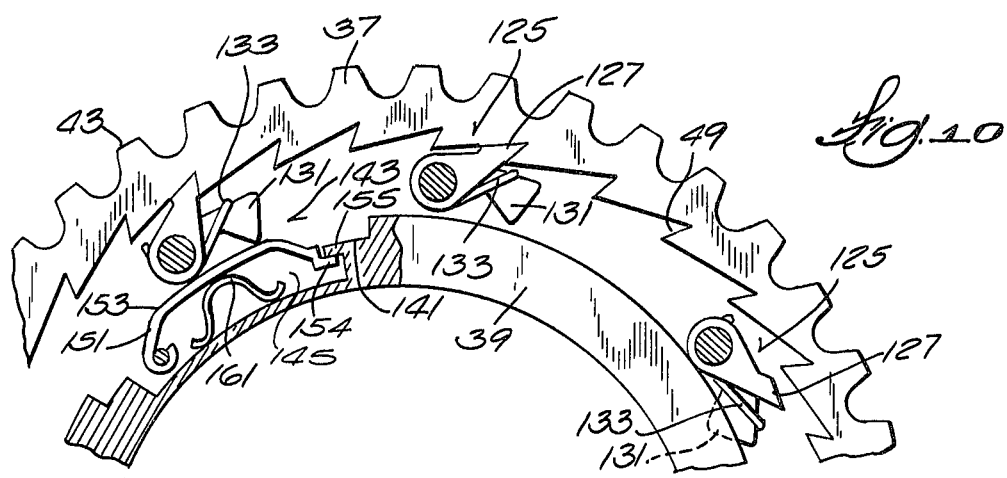
Fig. 10
Fig. 10a
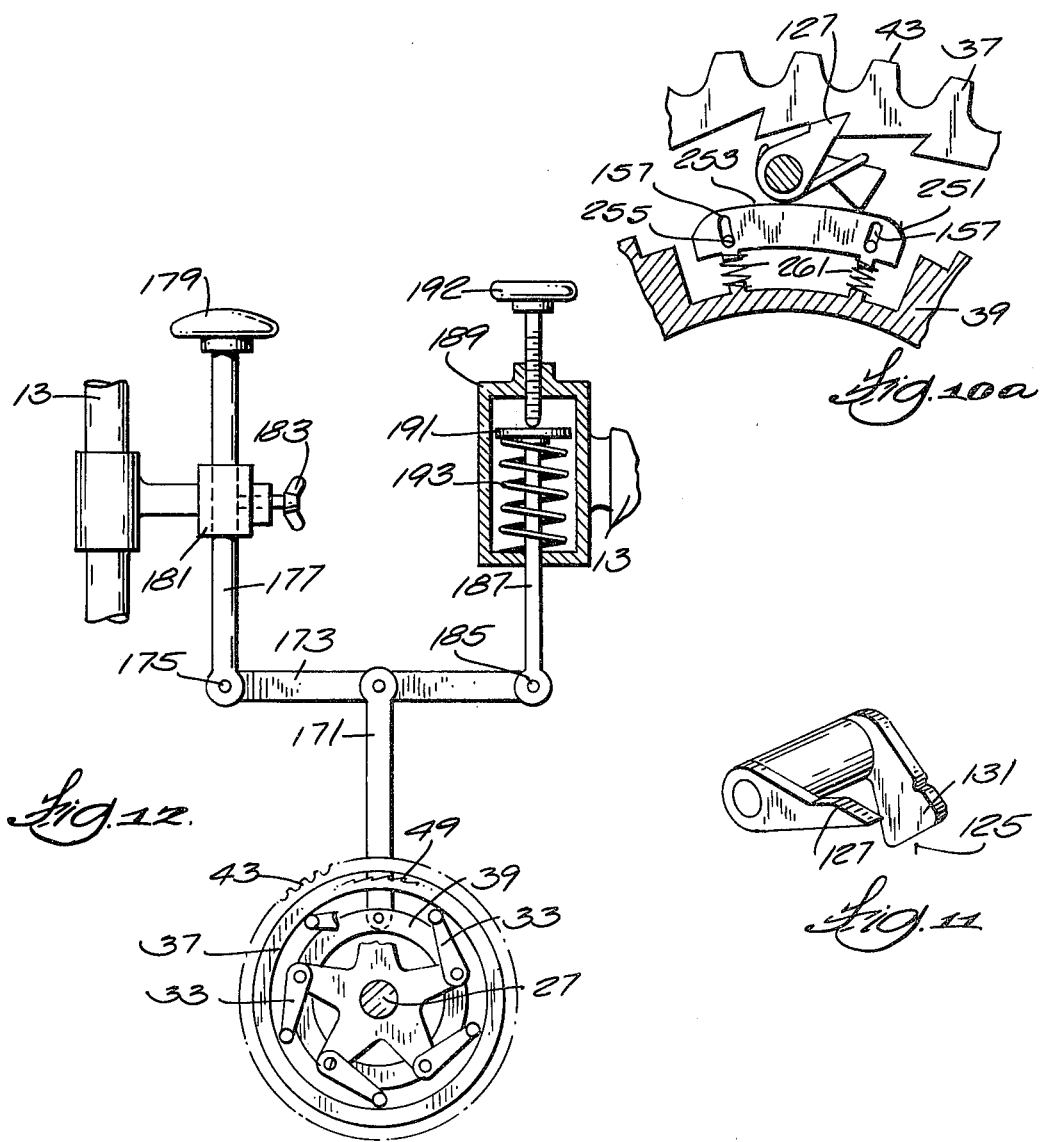
Fig. 12
Fig. 11

DEVICE FOR USE IN MECHANICAL POWER TRANSMISSION SYSTEM

BACKGROUND OF THE INVENTION

The invention relates generally to bicycles and to drive transmissions for bicycles. The invention also relates generally to drive transmissions and to couplings.

The invention disclosed herein is designed to eliminate the use of a deraileur on bicycles including the three speed hubs currently in use. In addition, the invention disclosed herein is designed to eliminate the chain tensioner also presently in use on bicycles as the chain length contemplated by the invention is not substantially varied. It is also contemplated by the invention to eliminate the rear sprocket cluster on multi-speed bikes and to eliminate the free wheeling mechanism incorporated in the rear hub of most bicycles currently in use. Still further, the invention is designed to afford shifting between high and low gear under load or while at rest and to provide both a manual and an automatic mode for shifting. Still further, the invention disclosed herein is intended to provide an infinitely variable speed ratio with a high to low speed range comparable to those presently available on current ten speed bicycles.

SUMMARY OF THE INVENTION

The invention provides a bicycle comprising a frame, a pair of wheels supporting the frame, a sprocket fixed to one of the wheels, a drive member rotatably carried by the frame, a pair of pedals connected to the drive member, a plurality of links carried by the drive member for common rotation therewith and for pivotal movement relative thereto, a driven member, an inner guide ring, means supporting the inner guide ring on the frame for transverse movement relative to the rotary axis of the drive member, means on each of the outer ends of the links and on the driven member and on the guide ring for mounting the driven member for common movement with the guide ring and for rotation relative thereto and for effecting rotation of the driven member in response to rotation of the drive member, means on the frame for displacing the guide ring relative to the rotary axis of the drive member to vary the rate of rotation of the driven member relative to the drive member, and an endless member trained around the sprocket and the driven member.

The invention also provides a variable speed transmission comprising a support or frame, a drive member rotatably carried by the support and adapted to be rotated by a power input source, a plurality of links carried by the drive member for common rotation therewith and for pivotal movement relative thereto, a driven member, an inner guide ring, means supporting the inner guide ring on the support for transverse movement relative to the rotary axis of the drive member, means on each of the outer ends of the links and on the driven member and on the guide ring for mounting the driven member for common movement with the guide ring and for rotation relative thereto, and for effecting rotation of the driven member in response to rotation of the drive member, and means on the support for displacing the guide ring relative to the rotary axis of the drive member to vary the rate of rotation of the driven member relative to the drive member.

In accordance with one embodiment of the invention, the means on each of the outer ends of the links and on the driven member and on the guide ring for mounting the driven member for common movement with the guide ring and for rotation relative thereto comprises guide means mounted on the outer ends of the links, an annular internal surface mounted on the driven member and engaging the guide means, and an outer annular surface on the guide ring and engaging the guide means.

In accordance with one embodiment of the invention, the means for displacing the guide ring comprises a hydraulic cylinder mounted on the frame, a piston in the cylinder, a piston rod connected to the piston and extending from the cylinder and connected to the guide ring to displace the guide ring in response to piston movement relative to the cylinder, means biasing the piston toward one end of the cylinder, a hydraulic line bypassing the piston and connected to the opposite ends of the cylinder, a valve in the bypass line movable between open and closed positions, and a lever operably connected to the valve for controlling movement thereof and adapted to be controlled by the operator.

In accordance with one embodiment of the invention, the means for effecting rotation of the driven member by the drive member comprising an internal ratchet wheel on the driven member, respective pawl members movably carried on the outer ends of each of the links, which pawl members each include a pawl part movable into engagement with the ratchet wheel to effect rotation of the driven member in response to rotation of the drive member and a cam part, means biasing the pawl members toward positions of engagement of the pawl parts with the ratchet wheels, and a cam surface on the inner ring engagable with the cam parts to disengage the pawl parts from the ratchet wheel during a portion of the rotary movement of the drive member.

In accordance with one embodiment of the invention, the guide means comprises guide posts and the pawl members partially laterally overlie the driven member and the guide ring to unify said guide ring and said driven member in a ring assembly in which the guide ring and the driven member have common movement transversely of the axis of rotation of the drive member and in which the driven member is rotatable relative to the guide ring.

In accordance with one embodiment of the invention, the links are pivotally connected to the drive member at positions located at a common radius from the axis of drive member rotation and at equi-angular relation thereabout.

One of the principal features of the invention is the provision of a bicycle incorporating a new and improved variable speed transmission.

Another of the principal features of the invention is the provision of a variable speed transmission particularly adapted for use in bicycles.

Other features and advantages of the embodiments of the invention will become known by reference to the following general description, appended claims and attached drawings.

THE DRAWINGS

FIG. 1 is a perspective view of a bicycle embodying various of the features of the invention.

FIG. 2 is a fragmentary side view illustrating a portion of the transmission incorporated in the bicycle shown in FIG. 1.

FIG. 3 is an enlarged fragmentary view of a portion of the transmission shown in FIG. 2.

FIG. 4 is an enlarged fragmentary sectional view taken generally along lines 4—4 of FIG. 1.

FIG. 9 is a view of a modified embodiment of the invention.

FIG. 10 is a schematic, partial elevational view of another embodiment of a transmission embodying various of the features of the invention.

FIG. 10a is a fragmentary schematic view of another embodiment similar to FIG. 10 of a transmission embodying various of the features of the invention.

FIG. 11 is an enlarged perspective view of one of the pawls incorporated in the embodiment shown in FIG. 10.

FIG. 12 is a schematic view of another arrangement for controlling the speed ratio of the transmission.

Figure 5:
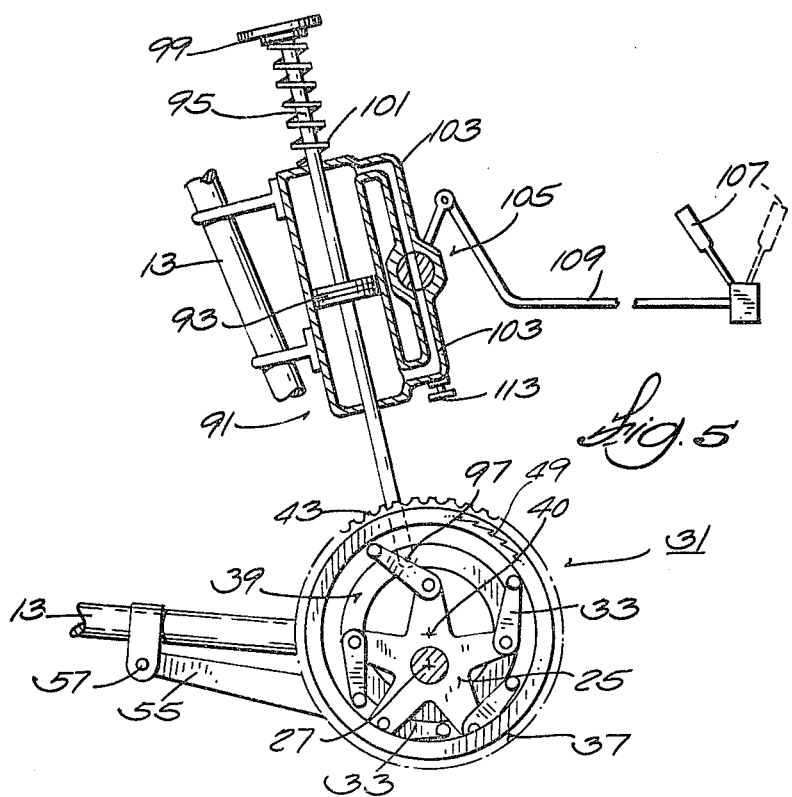
FIG. 5 is a view illustrating further components of the transmission incorporated in the bicycle shown in FIG. 1.

Before explaining the embodiments of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIG. 1 of the drawings is a bicycle 11 which includes a frame or support 13 which is carried for travel over the ground by front and rear rotatably mounted wheels 15 and 17 respectively. The frame 13 also supports a central bearing 19 journalling a double ended crank member 21 which, at its outer ends, supports a pair of foot pedals 23. Except as explained hereinafter, the bicycle 11 can be of any conventional construction.

The crank member 21 is fixed to or comprises a part of a drive member 25 which, in the illustrated construction, is generally star shaped and of plate-like construction and which has common rotation with the crank member 21 relative to the bicycle frame 13 about a fixed axis 27 established by the central bearing 19.

The drive member 25 forms one part of a variable speed transmission 31 which also includes a plurality of links 33 (five in the disclosed construction) which are pivotally mounted at a common radius and in equi-angularly spaced relation from the points of the star shaped drive member 25. At their outer ends, the links 33 are formed to include axially oppositely extending guide means which can be in the form of guide posts or stub shafts 35 which engage and support an outer ring or annular driven guide member 37 and which engage an inner ring or annular guide member 39.

More specifically, the outer ring or driven member 37 fixedly includes or has fixed thereon an inner annular surface 41 which engages the radially outer surfaces of the guide posts 35, together with a chain sprocket 43 which is engaged by a sprocket chain 45 to deliver power to a rear sprocket 47 fixed to the rear wheel 17. As will be referred to hereinafter, the outer ring or driven member 37 also includes an inwardly extending ratchet wheel 49.

The inner ring or annular guide member 39 has a center 40 and includes or has fixed thereto an outer annular peripheral surface 51 which engages the underside or inner surfaces of the guide posts 35, together with an arcuate cam surface 53 which extends about the annular ring or guide member 39 for a distance of about 270° and which will be referred to hereinafter.

The inner ring or guide member 39 includes or is fixed to a rearwardly extending arm 55 which is pivotally carried about an axis 57 fixed relative to the frame 13 by a bracket 59 fixed to one of the members of the frame. As a consequence, the inner ring or guide member 39 is carried for movement transversely of the rotary axis 27 of the drive member 25. In the specifically illustrated construction, such movement may be regarded as vertical movement in an arc such that the center 40 of the inner ring or guide member 39 moves along a path passing through or near the rotary axis 27 of the drive member 25. Such an arrangement suffices to maintain generally constant the spacing between the sprocket 43 on the driven member 37 and the sprocket 47 which is fixed to the rear wheel 17.

Other means can be provided for guiding movement of the inner ring or guide member 39 along a path which extends transversely of and approximately through the rotary axis 27 of the drive member 25 and which generally retains the chain 45 in a taut condition between the two sprockets 43 and 47, such as an arcuate path which has a uniform radius extending from the center of rotation of the rear wheel 17. If desired, a straight path could be employed.

Means are also provided on the outer ends of the links 33 and on the outer ring or driven member 37 for effecting rotation of the driven member 37 in response to rotation of the drive member 25. While various arrangements can be employed, in the illustrated construction, such means comprises respective pawl members 61 which are carried on the outer ends of the links 33 and which can be constructed in various ways, together with the ratchet wheel 49 carried on the outer ring or driven member 37. In the illustrated construction, each of the pawl members 61 includes a central shaft 63 which is journalled in a bore 65 in the guide post or stub shaft 35 at the outer end of the associated link 33 and which has fixed thereto, at one axial end, a pawl part 67 adapted for engagement with the ratchet wheel 49 so that, in response to rotation of the drive member 25 in the clockwise direction as shown in FIG. 2, the outer ring or driven member 37 will be rotated in the clockwise direction. At its other end, a cam or follower part 69 is fixedly connected to the shaft 63 and is adapted for engagement with the cam surface 53 on the inner ring or guide member 39 so as to displace the pawl part 67 out of engagement with the ratchet wheel 49. In the illustrated construction, the cam surface 53 extends for about 270° and thus, the pawl parts 67 are engaged with the ratchet wheel 49 only in a limited area at the top of the inner ring or guide member 39.

Means are provided for biasing the pawl members 61 into positions of engagement with the ratchet wheel 49 in the absence of engagement of the connected follower part 69 with the cam surface 53. Thus, in the disclosed construction, (See FIG. 3), there is associated with the outer end of each link 33 a helical tension spring 75 which is arranged to bias the associated pawl member 61 in the clockwise direction as shown in FIG. 3 and into engagement with the ratchet wheel 49.

The pawl parts 67 and follower parts 69 are designed to respectively laterally project into partially overlying relation to the outer ring or driven member 37 and inner ring or guide member 39 and to cooperate with the outer ends of the links 33 to prevent axial displacement of the inner and outer rings 37 and 39 and thereby to retain the outer and inner rings 37 and 39 in engagement with the guide posts 35 and so as thereby to unify the inner and outer rings 37 and 39 with the links 33 in a ring assembly 81.

As a result of the unification of the ring assembly 81, the outer ring or driven member 37 has common movement with the inner ring or guide member 39 along the transverse path of the inner ring or guide member 39 while, at the same time, rotation of the outer ring or driven member 37 relative to the inner ring or guide member 39 is permitted.

Means are also provided for displacing the unified ring assembly 81 along the transverse path so as to vary the ratio of the transmission, i.e., to vary the rate of rotation of the outer ring or driven member 37 as compared to the drive member 25. Various arrangements can be employed. In the illustrated construction, (See FIG. 5) such means comprises a hydraulic arrangement which includes a generally vertically oriented cylinder 91 mounted on the frame 13 and a piston 93 movable in the cylinder 91 and having extending therefrom a piston rod 95 which, at one end, extends through the lower end of the cylinder 91 and is pivotally connected to the inner ring or guide member 39 at 97 (See FIGS. 2 and 5), and which, at its other end, extends through the other or upper end of the cylinder 91 and has an enlarged upper external head 99. Located between the enlarged head 99 and the upper end of the cylinder 91 and in encircling relation to the piston rod 95 is a spring 101 which biases the piston rod 95 in the upward direction.

Although not shown, a suitable link connection or lost motion connection can be provided, if desired, between the lower end of the piston rod 95 and the inner ring or guide member 39 to facilitate movement of the inner ring or guide member 97 along its arcuate path.

Movement of the piston 93 in response to the action of the spring 101 and in opposition to the action of the spring 101 is controlled, in part, by a hydraulic conduit or line 103 which bypasses the piston 93 and is connected to the opposite ends of the cylinder 91. Included in the line 103 is an adjustable metering valve 105 which is movable between a first position closing the conduit or line 103 and a second or fully opened position. Movement of the valve 105 can be infinitely incrementally controlled by a remote lever 107 movably mounted, for instance, on the handle bar or elsewhere on the bicycle frame 13, together with a suitable motion transmitting connection between the lever 107 and the valve 105. Such connection can comprise either a suitable linkage 109 as shown in FIG. 5 or a flexible wire or cable (not shown).

Additionally, if desired, a needle valve 113 can also be incorporated in the line 103 to adjustably control the rate of flow of hydraulic fluid through the bypass line 103 when the metering valve 105 is fully opened.

In FIG. 9 there is disclosed another form of a pawl arrangement which can be pivotally mounted at the ends of the links 33 and which is adapted to engage to the ratchet wheel 49 to effect rotation of the driven member 37 in response to rotation of the drive member 25. The pawl arrangement disclosed in FIG. 9 differs primarily from the arrangement disclosed in FIGS. 2 through 5, in that the pawl member 121 operates to push the ratchet wheel 49, whereas the pawl members 61 operate to pull the ratchet wheel 49.

In operation, rotation of the drive member 25 causes rotary travel of the links 33 and pawl members 61. The bias provided by the springs 75 will effect engagement of the pawl parts 67 with the ratchet wheel 49 of the driven member 37 to cause consequent rotation of the driven member 37 except when disengaged as provided by the cam surface 53. Thus, in the illustrated construction, each of the pawl parts 67 will be successively engaged by the springs 75 with the ratchet wheel 49 during travel of the drive member 25 through an angular range of approximately 90°. Such engagement consequently causes rotation of the outer ring or drive member 37 in response to rotation of the drive member 25.

Variation in the drive ratio is provided by moving the ring assembly 81 transversely of the drive member 25. In this regard, as shown diagrammatically in FIG. 6, when the axis 27 of the drive member 25 and the center 40 of the inner ring or guide member 39 are coaxial, the outer ends of the links 33 are equi-angularly spaced and a given amount of rotation of the drive member 25 will result in an equal angular amount of rotation of the driven member or outer ring 37 with the periphery thereof traveling through a given distance.

Figure 6:
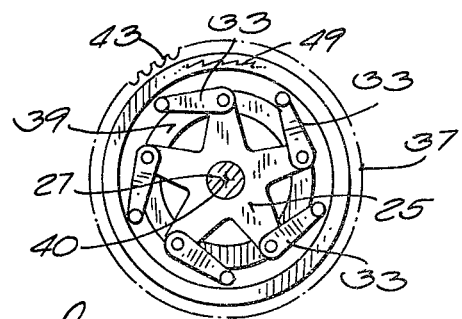
FIGS. 6, 7 and 8 are diagrammatic views illustrating the manner in which the drive ratio of the transmission incorporated in the bicycle shown in FIG. 1 is changed.
Figure 7:
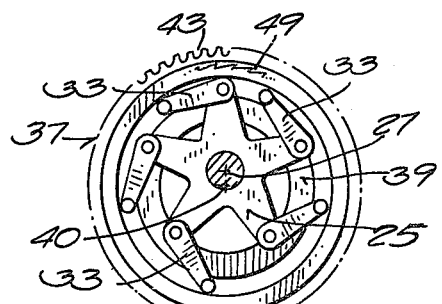

In the event that the center 40 of the guide member or inner ring 39 is located below the axis 27 of rotation of the drive member 25, as shown in FIG. 7, the ends of the links 33 will travel through an arc during the interval when the individual pawl parts 67 are engaged with the ratchet wheel 48 (and therefor drive the outer ring or driven member 37 through an arc) of less peripheral distance than the distance traveled when the components are as shown in FIG. 6 for the same amount of rotation of the drive member 25.

Figure 8:
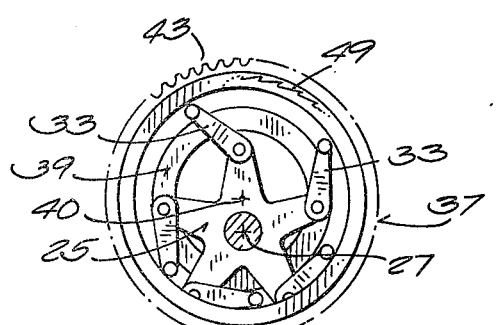

In the event that the center 40 of the guide member or inner ring 39 is located above the axis 27 of rotation of the drive member 25 as shown in FIG. 8, the ends of the links 33 will travel thrugh an arc during the interval when the individual pawl parts 67 are engaged with the ratchet wheel 49 (and therefor drive the outer ring or driven member 37 through an arc) of greater peripheral distance than the distance traveled when the components are as shown in FIG. 6 for the same amount or rotation of the drive member 15.

Thus, movement of the ring assembly 81 transversely of the drive member 25 serves to change the output of the transmission between low gear, i.e., less peripheral travel of the outer ring or driven member 37 as compared to, when the center of the guide member or inner ring 39 is located beneath the axis 27 of rotation of the drive member 25, and high gear, i.e., greater peripheral travel of the driven member or outer ring 37 as compared to when the center 40 of the guide member or inner ring 37 is located above the axis 27 or rotation of the drive member 25.

It will further be noted that the spring 101 biases the piston 93 upwardly and therefor also biases the ring assembly 81 upwardly, to high gear position, and that, during pedaling, in response to the encountering of a relatively high load, as for instance, when accelerating or when going uphill, the application or force through the pedals 23 to the crank member 21 serves to depress the ring assembly 81 and thereby automatically changes the ratio of the transmission from high gear to low gear. When a lessening of the load is encountered, the spring 101 will automatically tend to displace the spring assembly 81 upwardly relative to the axis 27 of rotation of the drive member 25 and thereby bring about a high gear condition.

The rate at which the change in gear condition occurs can be controlled by the setting of the valve 105 which regulates hydraulic flow from one side of the piston 93 to the other. Closing of the valve 105 prevents fluid flow and can be employed to lock the transmission in any setting then existing. Thus, in addition to operator control of the rate of change in the drive, the transmission can be locked or unlocked by the operator at any desired time at the then existing setting.

It is also to be noted that the disclosed transmission provides infinite variation in the drive ratio and automatically adjusts to changes in load conditions.

Shown in FIG. 10 is a further modification of the arrangement shown in FIG. 9, which modification can be used in lieu of the construction shown in FIGS. 3 and 9, and which is adapted for rotatably driving the outer driven member 37 and therefore the sprocket 43 from the drive member 25. More specifically in the construction shown in FIG. 10, the links 33 have pivotally mounted at their outer end, pawls 125 which include extensions or tangs 127 (see also FIG. 11) adapted, in response to clockwise rotation as shown in FIG. 10, to engage the ratchet wheel 49 so as to rotatably push the outer ring or annular driven member 37, including the sprocket 43.

As contrasted to the construction shown in FIG. 9, the pawls 125 are each provided with a cam follower 131 which leads, as distinguished from follows, the pivotal connection of the pawls 125 with the links 33 and which is engageable with the inner ring or annular guide member or cam 39.

Means in the form of a helical spring 133 is provided for biasing the pawls 125 for rotary movement relative to the links 33 away from engagement with the ratchet wheel 49.

In addition, in the construction shown in FIGS. 10 and 11, the annular guide member or cam 39 is provided with a retaining portion 141 which, when engaged with the pawl follower 131 under the influence of the spring 133, maintains a slight clearance between the pawl 125 and the ratchet 49. In addition, the annular guide member or cam 39 includes a lifting portion 143 which, when engaged by the pawl followers 131, effects rotation of the pawls 125 so as to engage the extension or tangs 127 with the ratchet wheel 49.

In accordance with the construction shown in FIG. 10, the cam lifting portion 143 includes, in the outer periphery of the annular guide member or cam 39, a recess 145. Lifting of the pawl follower 131 is provided by a lifter cam part 151 which includes a portion 153 raised above the adjacent periphery of the retainer portion 141 of the inner ring or cam 39 and which is pivotally connected to the inner ring or cam 39 for movement between an outwardly projecting position and an inwardly, relatively retracted, position.

Means are provided on the lifter cam part 151 and on the inner ring, or annular guide member or cam 39 for limiting outward movement of the lifter cam part 151 relative to the annular guide member or cam 39. While various arrangements can be employed, in the illustrated construction, such means comprises a pair of interacting ears or tabs 154 and 155.

Means are provided for biasing the lifter cam part 151 to its projecting position. While various arrangements can be employed, in the illustrated construction, such means comprises a retention spring 161 which produces a biasing force of greater magnitude than that of the torsion springs 133 so as to thereby overcome the helical torsion springs 133 on the pawls 125 and so as thereby to urge the pawls 125 towards positions of engagement of the tangs or extensions 127 with the ratchet wheel 49 when the pawl followers 131 pass over the lifter cam part 151. Because of the illustrated shape of the pawl tangs 127 and of the ratchet wheel 49 and because of the pushing arrangement, after partial initial engagement of the tangs 127 with the ratchet wheel 49 in response to engagement of the follower 131 with the lifter cam part 151, continued drive pressure will cause full engagement of the associated pawl tang 127 with the ratchet wheel 49, which full engagement will be continued as long as drive pressure is maintained.

Shown in FIG. 10a is still another modified embodiment of the invention. The construction in FIG. 10a is generally the same as that shown in FIG. 10, except that a modified lifter cam part 251 is employed, which cam part includes a crowned outer surface 253 and is guided for radial movement by a pair of pins 255 which extend from the annular guide member or cam 39 and which project into a pair of guide slots 157 in the lifter cam part 251.

Means are provided for yieldably radially outwardly biasing the lifter cam part 251. While various constructions can be employed in the construction shown in FIG. 10a, such means comprises a pair of helical compression springs 261. In other respects the construction shown in FIG. 10a is generally shown in the construction shown in FIG. 12.

Shown in FIG. 12 is a mechanical arrangement for controlling the transmission speed ratio, i.e., for displacing the inner ring or guide member or cam 39 so as to afford variation in the speed ratio. In the construction shown in FIG. 12, the inner ring or guide member or cam 39 is pivotally attached to one end of a link 171 which, at its other end, is pivotally connected to the intermediate portion of a double ended lever 173. At one end 175, the double ended lever 173 is pivotally connected to one end of an adjustably located shift control member 177 which, at its upper end, is formed with a knob or handle 179. The shift control member 177 passes through a guide or sleeve 181 which is fixedly mounted on the bicycle frame 13 and which includes means in the form of a wing nut 183 for releasably locking the shift control member 177 or 185 against movement relative to the guide or sleeve 181.

At its other end, the double ended lever 173, is pivotally connected to a second member 187 which movably extends through a guide bracket 189 supported by the bicycle frame 13 and which, at its upper end, includes a head 191. Located between the head 191 and the guide bracket 189 is a biasing spring 193 which serves to yieldably bias upwardly the second member 187 and therefore to lift the link 171.

Means are provided for limiting the uppermost position of the second member 187. While various arrangements can be employed, in the illustrated construction, such means comprises an adjusting screw 192 which threadedly extends through the bracket 189 for engagement with the head 191 of the second member 187 so as to adjustably limit upward movement of the second member 187.

In operation of the arrangement shown in FIG. 12, the adjusting screw 192 can be fully threaded toward the second member 187 so as to fully collapse the spring 193 and thereby stationarily locate the end 185 of the lever 173. Under such circumstances, the drive ratio is controlled by operation of the shift control member 177.

Alternately, the adjusting screw 192 can be adjusted to its uppermost position so as thereby to permit full extension of the spring 193 and thereby afford full spring travel. When the shift control member 177 is located in its fully raised position, and located by the wing nut 183, the end 175 of the lever 173 is fixed and the transmission is then in an automatic mode of operation. Specifically, under minimal loading, the drive ratio is relatively high. However, if the loading increases, the drive ratio is reduced and conversely, if the loading decreases, the drive ratio is increased.

Various of the features of the invention are set forth in the following claims.

What is claimed is:

1. A bicycle comprising a frame, a pair of wheels supporting said frame, a sprocket fixed to one of said wheels, a drive member rotatably carried by said frame, a pair of pedals connected to said drive member, a plurality of links carried by said drive member for common rotation therewith and for pivotal movement relative thereto, a driven member, an inner guide ring, means supporting said inner guide ring on said frame for transverse movement relative to the rotary axis of said drive member, means on each of the outer ends of said links and on said driven member and on said guide ring for mounting said driven member for common movement with said guide ring and for rotation relative thereto and for effecting rotation of said driven member in response to rotation of said drive member, means on said frame for displacing said guide ring relative to the rotary axis of said drive member to vary the rate of rotation of said driven member relative to said drive member, and an endless member trained around said sprocket and said driven member.

2. A bicycle in accordance with claim 1 wherein said means on each of the outer ends of said links and on said driven member and on said guide ring for mounting said driven member for common movement with said guide ring and for rotation relative thereto comprises guide means mounted on the outer ends of said links, an annular internal surface mounted on said driven member and engaging said guide means, and an outer annular surface on said guide ring and engaging said guide means.

3. A bicycle in accordance with claim 1 wherein said means for displacing said guide ring comprises a hydraulic cylinder mounted on said frame, a piston in said cylinder, a piston rod connected to said piston and extending from said cylinder and connected to said guide ring to displace said guide ring in response to piston movement relative to said cylinder, means biasing said piston toward one end of said cylinder, a hydraulic line bypassing said piston and connected to the opposite ends of said cylinder, a valve in said bypass line movable between open and closed positions, and a lever operably connected to said valve for controllng movement thereof and adapted to be controlled by the operator of the bicycle.

4. A bicycle in accordance with claim 1 wherein said means for effecting rotation of said driven member by said drive member comprises an internal ratchet wheel on said driven member, respective pawl members movably carried on the outer ends of each of said links, each of said pawl members including a pawl part movable into engagement with said ratchet wheel to effect rotation of said driven member in response to rotation of said drive member and a cam part, means biasing said pawl members toward positions of engagement of said pawl parts with said ratchet wheels, and a cam surface on said inner ring engagable with said cam parts to disengage said pawl parts from said ratchet wheel during a portion of the rotary movement of said drive member.

5. A bicycle in accordance with claim 4 wherein said guide means comprises guide posts and wherein said pawl members partially laterally overlie said driven member and said inner ring to unify said inner ring and said driven member in a ring assembly in which said inner ring and said driven member have common movement transversely of the axis of rotation of said drive member and in which said driven member is rotatable relative to said inner ring.

6. A bicycle in accordance with claim 1 wherein said links are pivotally connected to said drive member at positions located at a common radius from the axis of drive member rotation and at equiangular relation thereabout.

7. A bicycle in accordance with claim 6 wherein said plurality of links comprises five.

8. A bicycle comprising a frame, a pair of wheels supporting said frame, a first sprocket fixed to one of said wheels, a drive member rotatably carried by the frame, a pair of pedals connected to said drive member, a plurality of links carried by said drive member for common rotation therewith and for pivotal movement relative thereto, each of said links having, at the outer end thereof, a guide post and a pivotally mounted pawl member, an outer ring having an annular internal surface engaging said guide posts and fixedly including a second sprocket and an internally projecting ratchet wheel, an inner ring, means supporting said inner ring on said frame for transverse movement relative to the rotary axis of said drive member, said inner ring having an outer annular surface engaging said guide posts and including a cam surface, each of said pawl members including a pawl part movable into engagement with said ratchet wheel to effect rotation of said outer ring in response to rotation of said drive member, and a cam part engageable with said cam surface to displace said pawl part out of engagement with said ratchet wheel, means biasing said pawl members toward positions of engagement of said pawl parts with said ratchet wheel, means on said frame for displacing said inner ring relative to the rotary axis of said drive member to vary the rate of rotation of said outer ring relative to said drive member, and a sprocket chain trained around said first and second sprockets.

9. A variable speed transmission comprising a support, a drive member rotatably carried by said support and adapted to be rotated by a power input source, a plurality of links carried by said drive member for common rotation therewith and for pivotal movement relative thereto, a driven member, an inner guide ring, means supporting said inner guide ring on said support for transverse movement relative to the rotary axis of said drive member, means on each of the outer ends of said links and on said driven member and on said guide ring for mounting said driven member for common movement with said guide ring and for rotation relative thereto, and for effecting rotation of said driven member in response to rotation of said drive member, and means on said support for displacing said guide ring relative to the rotary axis of said drive member to vary the rate of rotation of said driven member relative to said drive member.

10. A transmission in accordance with claim 9 wherein said means on each of the outer ends of said links and on said driven member and on said guide ring for mounting said driven member for common movement with said guide ring and for rotation relative thereto comprises guide means mounted on the outer ends of said links, an annular internal surface mounted on said driven member and engaging said guide means, and an outer annular surface on said guide ring engaging said guide means.

11. A transmission in accordance with claim 9 wherein said means for displacing said guide ring comprises a hydraulic cylinder mounted on said frame, a piston in said cylinder, a piston rod connected to said piston and extending from said cylinder and connected to said guide ring to displace said guide ring in response to piston movement relative to said cylinder, means biasing said piston toward one end of said cylinder, a hydraulic line bypassing said piston and connected to the opposite ends of said cylinder, a valve in said bypass line movable between open and closed positions, and a lever operably connected to said valve for controlling movement thereof and adapted to be controlled by the operator.

12. A transmission in accordance with claim 9 wherein said means for effecting rotation of said driven member by said drive member comprises an internal ratchet wheel on said driven member, respective pawl members movably carried on the outer ends of each of said links, each of said pawl members including a pawl part movable into engagement with said ratchet wheel to effect rotation of said driven member in response to rotation of said drive member and a cam part, means biasing said pawl members toward positions of engagement of said pawl parts with said ratchet wheels, and a cam surface on said inner ring engageable with said cam parts to disengage said pawl parts from said ratchet wheel during a portion of the rotary movement of said drive member.

13. A transmission in accordance with claim 12 wherein said guide menas comprises guide posts and wherein said pawl mmbers partially laterally overlie said driven member and said guide ring to unify said guide ring and said driven member in a ring assembly in which said guide ring and said driven member have common movement transversly of the axis of rotation of said drive member and in which said driven member is rotatable relative to said guide ring.

14. A transmission in accordance with claim 9 wherein said links are pivotally connected to said drive member at positions located at a common radius from the axis of drive member rotation and at equiangular relation thereabout.

15. A transmission in accordance with claim 14 wherein said plurality of links comprises five.

16. A transmission in accordance with claim 9 wherein said means for effecting rotation of said driven member by said drive member comprises an internal ratchet wheel on said driven member, respective pawl members movably carried on the outer ends of each of said links, each of said pawl members being movable between a drive position engaged with said ratchet wheel and a non-drive position disengaged from said ratchet wheel, said pawl members each including a pawl part engageable, when said pawl is in the drive position, with said ratchet wheel to effect rotation of said driven member in response to rotation of said drive member, each of said pawl members also including a cam part, means biasing said pawl members toward said non-drive positions, and a cam surface on said inner ring engageable with said cam parts to displace said pawl parts toward said drive positions during a portion of the rotary movement of said drive member.

17. A transmission in accordance with claim 16 wherein said pawl member push said ratchet wheel.

18. A transmission in accordance with claim 16 wnerein said pawl members are dimensioned so as to provide, when said pawl members are disengaged from said ratchet wheel, a clearance between said pawl members and said ratchet wheel.

19. A transmission in accordance with claim 16 wherein said cam surface comprises a lifter engageable with said pawl members to displace said pawl members into said drive position.

* * * * *